United States Patent [19]

Hazelton et al.

[11] Patent Number: 4,978,717

[45] Date of Patent: Dec. 18, 1990

[54] THERMOELASTIC COMPOSITION OF ETHYLENE-1-OLEFIN COPOLYMER AND RUBBER

[75] Inventors: Donald R. Hazelton, Chatham; Robert C. Puydak, Cranbury, both of N.J.

[73] Assignee: Exxon Chemical Patents Inc., Linden, N.J.

[21] Appl. No.: 340,483

[22] Filed: Apr. 19, 1989

[51] Int. Cl.$^5$ .................. C08L 23/26; C08L 23/20; C08L 9/00; C08L 23/16

[52] U.S. Cl. .................................... 525/195; 525/192; 525/194; 525/196; 525/197; 525/211; 525/232; 525/240; 524/525; 524/528

[58] Field of Search ............... 525/194, 197, 211, 195, 525/232, 240

[56] References Cited

U.S. PATENT DOCUMENTS

| | | | |
|---|---|---|---|
| 2,369,471 | 2/1945 | Latham | 260/4 |
| 3,037,954 | 6/1962 | Gessler et al. | 260/29.8 |
| 3,081,279 | 3/1963 | Hammel et al. | 260/45.5 |
| 3,326,833 | 6/1967 | Raley | 260/28.5 |
| 3,758,643 | 9/1973 | Fischer | 260/897 A |
| 3,806,558 | 4/1974 | Fischer | 260/897 A |
| 4,104,210 | 8/1978 | Coran et al. | 260/4 R |
| 4,130,534 | 12/1978 | Coran et al. | 260/33.6 |
| 4,426,498 | 1/1984 | Inoue et al. | 525/240 |
| 4,607,074 | 8/1986 | Hazelton et al. | 525/197 |
| 4,639,487 | 1/1987 | Hazelton et al. | 524/425 |
| 4,722,973 | 2/1988 | Yamaoka et al. | 525/194 |
| 4,775,722 | 10/1988 | Kobayashi et al. | 525/197 |

OTHER PUBLICATIONS

Plastics & Rubber International, "VLDPE-A New Class of PE", vol. 11, No. 2, Apr., 1986, pp. 34-36.
J. Rubber Chem. And Tech., vol. 30, pp. 928-951, Gerard Kraus, "Degree of Cure in Filler-Reinforced Vulcanizates by the Swelling Method".

*Primary Examiner*—Carman J. Seccuro
*Attorney, Agent, or Firm*—W. G. Muller; M. L. Gibbons

[57] ABSTRACT

Thermoplastic compositions are prepared by blending an ethylene-hexene and/or an ethylene-butene copolymer resin, with a rubber and dynamically vulcanizing the rubber to form a heat-shrinkable dynamically vulcanized alloy of exceptionally low hardness, and great flexibility and elasticity. The preferred rubber is halogenated butyl rubber. Uncured rubber can be included in the composition.

22 Claims, No Drawings

THERMOELASTIC COMPOSITION OF ETHYLENE-1-OLEFIN COPOLYMER AND RUBBER

BACKGROUND OF THE INVENTION

1. Field of the Invention

This invention relates to thermoplastic elastomeric compositions which, while having the reprocessibility of thermoplastic resins, are yet heat shrinkable, elastomeric in nature, and of low hardness. The result of this invention is accomplished by blending in or as a thermoplastic resin a plastomeric ethylene copolymer resin with a rubber and vulcanizing the rubber by dynamic vulcanization techniques.

2. Background

Polymer blends which have a combination of both elastic and thermoplastic properties are of significant commercial interest. Such thermoelastic compositions are generally obtained by blending an elastomeric polymer with a thermoplastic resin in a way such that the elastomer is intimately and uniformly dispersed as a discrete phase within a continuous phase of the thermoplastic resin. These polymer blends have been given the generic designation of Thermoplastic Olefins ("TPO"). They exhibit some of the properties of a cured elastomer as well as the reprocessibility of a thermoplastic resin. The elastomeric characteristics are enhanced if one component of the blend is a vulcanizable elastomer which is wholly or partially cross-linked.

The earliest work in the curing of a TPO composition was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The blend resulting is a micro-gel dispersion of cured elastomer in an uncured matrix of resinous thermoplastic polymer.

Gessler, '954 discloses compositions comprising polypropylene and a rubber such as, inter alia, butyl rubber; chlorinated butyl rubber, polybutadiene, polychloroprene and polyisobutene. Compositions of about 50 to 95 parts polypropylene and about 5 to 50 parts of rubber are disclosed.

U.S. Pat. Nos. 3,758,643 and 3,806,558 disclose TPO type polymer blends comprising an olefin thermoplastic resin and and olefin copolymer rubber wherein the rubber is dynamically cured to a partial cure state. The compositions are reprocessible and result in molded products having good surface appearance. However, the potential applications of such blends are limited by their high compression set and/or low softening temperature resulting from only a partial cure of the rubber. Furthermore, the partial peroxide cure utilized in such blends is difficult to control from the standpoint of completeness of reaction, resulting in batch to batch variations in product properties.

U.S. Pat. No. 4,104,210 discloses TPO blends which comprise about 25 to 45 parts of a polyolefin resin and from about 55 to 75 parts of a diene rubber which is a homopolymer or copolymer of a diolefin. U.S. Pat. No. 4,130,534 discloses TPO blends which comprise up to 60 wt % of a polyolefin resin and 40 wt % or more of a butyl rubber. The butyl rubbers utilized include butyl rubber per se as well as chlorinated or brominated butyl rubber. In each of the TPO blends described by the '210 and '534 patents the rubber component is said to be fully cured, the cure being a dynamic vulcanization. The preferred polyolefin thermoplastic phase for each is stated to be polyethylene or polypropylene, with polypropylene the most preferred.

TPO systems wherein the rubber is fully cured have the disadvantage that, as a result of poor flow characteristics, injection molded components made from such TPO's exhibit "flow line" imperfections. As a consequence, special mold designs are required to minimize the problem, especially for large parts. Applications are further limited because of the high Shore A hardness of such compositions.

U.S. Pat. No. 3,081,279 discloses compositions wherein a rubber, such as butyl rubber, is combined with a sulfochlorinated polyolefin resin and cured. The uncured blend is said to have improved processing characteristics.

U.S. Pat. No. 2,369,471 discloses blends of ethylene polymers with various hydrocarbon rubbers and halogenated rubbers. The compositions are either uncured or compression molded vulcanizates.

U.S. Pat. No. 3,326,833 discloses compositions of a copolymer of ethylene with an alkyl ester of an alpha-beta-monethylenically unsaturated monocarboxylic acid, e.g., ethylene-ethylacrylate copolymer, and a halogenated olefin polymer. The rubber can be halogenated butyl rubber or chlorinated polyethylene. The compositions when uncured are thermoplastic and when peroxide cross-linked form insoluble non-thermoplastic resins.

U.S. Pat. No. 4,639,487 discloses a TPO blend which utilizes as the thermoplastic continuous phase an ethylene vinyl ester or ethylene-alkylacrylate copolymer with a rubber component which may be a butyl rubber, halogenated butyl rubber, polyisoprene, polychloroprene, styrene-butadiene rubber, nitrile rubber, chlorosulfonated polyethylene, etc., wherein the rubber component is dynamically vulcanized to disperse the rubber as fully cured fine particles of a "micro-gel" within the thermoplastic matrix. Such TPO compositions possess exceptional resiliency, high coefficient of friction surfaces and low compression set.

Although the TPO blends as disclosed by U.S. Pat. No. 4,639,487 have improved properties compared to prior types of TPO blends, it is still desirable to develop a TPO of even further improved properties, as with respect to lower hardness and increased flexibility at comparable degrees of elasticity and, particularly, with respect to improved high temperature processing stability. The TPO compositions of U.S. Pat. No. 4,639,487 wherein the vinyl ester content of the thermoplastic component exceeds about 20 wt % tend to become cured or thermoset upon prolonged exposures to injection processing temperatures.

SUMMARY OF THE INVENTION

A low hardness heat shrinkable, reprocessible TPO can be prepared by utilizing as or in the thermoplastic resin a plastomeric ethylene copolymer, such as ethylene-hexene and ethylene-butene, and fully curing the rubber component of the TPO by dynamic vulcanization.

The preferred plastomeric ethylene copolymers which may be utilized in or as the thermoplastic resin are those ethylene-hexene and ethylene-butene copolymers having a hexene-1 or butene-1 content of from about 15 to about 40 wt %, a melt index (MI) of from about 0.3 to about 50, a degree of crystallinity of from about 5 to about 85 J/g and a density of about 0.870 to about 0.900.

The preferred rubber component of the invention TPO is halogenated butyl rubber.

TPO compositions in accordance with the invention possess exceptionally low hardness, flexibility and elasticity. Further, such TPO compositions are completely rheologically stable at the elevated temperatures that are typically employed in processing such compositions by injection, extrusion or compression molding into finished articles.

DETAILED DESCRIPTION

As used in the specification and claims, the term "dynamic vulcanization" means a vulcanization process for a rubber containing TPO composition wherein the rubber is vulcanized under conditions of high shear, as a result of which, the rubber is simultaneously cross-linked and dispersed as fine particles of a "micro-gel" within the thermoplastic resin matrix. Dynamic vulcanization is effected by mixing the TPO ingredients at a temperature which is at or above the curing temperature of the rubber in equipment such as roll mills, Banbury mixers, continuous mixers, kneaders or mixing extruders, e.g., twin screw extruders. The unique characteristic of the dynamically cured compositions is that, notwithstanding the fact that the rubber component is fully cured, the compositions can be processed and reprocessed by conventional rubber processing techniques such as extrusion, injection molding, compression molding, etc. Scrap or flashing can be salvaged and reprocessed.

The term "dynamic-ally vulcanized alloy" (DVA) as used in the specification and claims means a composition comprising a thermoplastic resin containing a ethylene-hexene copolymer and a rubber wherein at least a part of the rubber has been dynamically vulcanized to a fully cured state. The DVA compositions are prepared by blending together the ethylene-hexene copolymer containing thermoplastic resin and rubber with curatives and fillers under conditions of dynamic vulcanization.

In preparing the heat shrinkable DVA compositions of this invention, the plastomeric ethylene copolymer containing thermoplastic resin is blended with at least one rubber and the rubber is vulcanized by dynamic vulcanization. While blends of polyolefin thermoplastic resins may be utilized in the practice of this invention, the preferred polyolefin thermoplastic resin is or contains a copolymer of ethylene with hexene or butene. The DVA composition of this invention must include a plastomeric ethylene copolymer within the polyolefin thermoplastic resin from which the DVA is prepared. Polyolefins apart from the ethylene copolymer which can optionally be incorporated in the compositions of the invention include polybutylene, low density polyethylene (LDPE), and linear low density polyethylene (LLDPE).

Polyolefin resins which can optionally be included in the compositions of this invention include polybutylene, LDPE and LLDPE as well as copolymers of ethylene with unsaturated esters of lower carboxylic acids. The term "polybutylene" generally refers to thermoplastic resins of both poly(1-butene)homopolymer and the copolymer with, for example, ethylene, propylene, pentene-1, etc. Polybutylene is manufactured via a stereospecific Ziegler-Natta polymerization of monomer(s). Commercially useful products are of high molecular weight and isotacticity. A variety of commercial grades of both homopolymer and ethylene copolymer are available with melt indices that range from about 0.3 to about 20 g/10 min.

The term "low density polyethylene" or "LDPE" as used in the specification and claims mean both low and medium density polyethylene having densities of about 0.910 to about 0.940 g/cc. The terms include linear polyethylene as well as copolymers of ethylene which are thermoplastic resins.

Linear low density polyethylene (LLDPE) is a class of low density polyethylene characterized by little, if any, long chain branching, in contrast to conventional LDPE. The processes for producing LLDPE are well known in the art and commercial grades of this polyolefin resin are available. Generally, it is produced in gas-phase fluidized bed reactors or liquid-phase solution process reactors; the former process can be carried out at pressures of about 100 to 300 psi and temperatures as low as 100° C.

The term "plastomeric ethylene copolymer" as used herein includes both plastomeric ethylene-hexene copolymers and ethylene-butene copolymers.

The terms "ethylene-hexene copolymer" and "ethylene-butene copolymer" resin as used herein mean a copolymer of ethylene with 1-hexene or 1-butene respectively wherein the hexene or butene content of the respective copolymers is from about 1 to about 50, preferably from about 10 to about 45, and most preferably from about 15 to about 40 wt %. The ethylene-hexene or ethylene-butene copolymers suitable for use in the practice of this invention have a melt index (MI) measured by ASTM Standard D1238 Condition E of from about 0.3 to about 50 and preferably from about 0.5 to about 10. The ethylene-hexene or ethylene-butene copolymer should preferably have a degree of crystallinity measured as a heat of fusion by DSC of from about 5 to about 85 J/g. The preferred ethylene-hexene or ethylene-butene copolymers have a density of from about 0.870 to about 0.900. For greatest elasticity or flexibility, the ethylene-hexene or ethylene-butene copolymer should have a density less than or equal to 0.900 and a minimum comonomer content of 20 wt %.

Both the ethylene-hexene or ethylene-butene copolymers required for use in the practice of this invention are commercially available in a variety of different grades.

The curable rubbers which can be used in the practice of this invention include both synthetic and natural rubbers; at least one of the rubbers utilized must be vulcanizable. Illustrative, non-limiting examples of rubbers suitable for use in the practice of this invention include butyl rubber, halogenated butyl rubber, ethylene-propylene-diene rubber (EPDM), polyisoprene, polychloroprene, styrene-butadiene rubber, nitrile rubbers, chlorosulfonated polyethylene, etc.

The term "rubber" as used in the specification and claims means any natural or synthetic polymer which can be vulcanized or cured so as to exhibit elastomeric properties. Since the plastomeric ethylene copolymer will peroxide cure and therefore lose its thermoplastic properties, rubbers such as ethylene-propylene copolymers (EPM) which require a peroxide cure should not be used as the curable rubber component in the practice of this invention.

The terms EPM and EPDM are used in the sense of their ASTM designations. EPM is an ethylene-propylene copolymer rubber which can be cross-linked by radiation curing or peroxide curing. EPDM is terpolymer of ethylene, propylene and a non-conjugated diene. Illustrative non-limiting examples of suitable non-conjugated dienes are 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; tetrahydroindene; methyltetrahydroindene; dicyclopentadiene; 5-isopropylidene-2-norbornene; 5-vinyl-norbornene; etc.

The term "nitrile rubber" means an acrylonitrile copolymer rubber. Suitable nitrile rubbers comprise rubbery polymers of 1,3-butadiene or isoprene and acrylonitrile. Preferred nitrile rubbers comprise polymers of 1,3-butadiene and about 20–50 wt % acrylonitrile. Any nitrile rubber which is a "solid" rubber having an average molecular weight of at least 50,000, and preferably between about 100,000–1,000,000 can be used. Commercially available nitrile rubbers suitable for the practice of the invention are described in *Rubber World Blue Book*, 1980 Edition, Materials and Compounding Ingredients for Rubber, pages 386–406.

Butyl rubber is a copolymer of an isoolefin and a conjugated multiolefin. The useful rubber copolymers comprise a major portion of isoolefin and a minor amount, preferably not more than 30 wt %, of a conjugated multiolefin. The preferred rubber copolymers comprise about 85–99.5 wt % (preferably 95–99.5 wt %) of a $C_4$–$C_7$ isoolefin, such as isobutylene, and about 15–0.5 wt % (preferably 5–0.5 wt %) of a multiolefin of about 4–14 carbon atoms. These copolymers are referred to in the literature as "butyl rubber"; see for example, the textbook *Synthetic Rubber* by G. S. Whitby (1954 edition by John Wiley and Sons, Inc.), pages 838–891, etc. The term "butyl rubber" as used in the specification and claims includes the aforementioned copolymers of an isoolefin having 4–7 carbon atoms and about 0.5 to 20 wt % of a conjugated multiolefin of about 4–10 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc. Commercial butyl rubber is a copolymer of isobutylene and minor amounts of isoprene.

Butyl rubber as above described may be halogenated with from about 0.1 to about 10, preferably, about 0.5 to about 3.0 wt % chlorine or bromine. The chlorinated species of butyl rubber is commonly referred to as chlorinated butyl rubber.

The plastomeric ethylene copolymer resin component used in the practice of this invention comprises about 25 to 100 wt % of the thermoplastic resin component of the blend; preferably the ethylene copolymer resin component comprises about 35 to about 100 wt % thermoplastic resin; more preferably about 45 to about 100 wt %. In its most preferred embodiment, the thermoplastic resin of the DVA of this invention consists solely of the plastomeric ethylene copolymer.

When the LDPE, LLDPE or polybutylene, which may optionally be included in the thermoplastic resin component of the composition, is utilized it comprises about 0 to 75 wt % of the thermoplastic resin component; preferably about 0 to about 65 wt %; more preferably about 0 to about 55 wt %.

The thermoplastic resin is blended with at least one rubber and the rubber component of the blend is vulcanized using dynamic vulcanization techniques. The thermoplastic resin comprises about 20 to about 90 wt % based on the resin plus rubber in the DVA; preferably about 30 to about 80 wt %; more preferably about 40 to about 60 wt %. The rubber component of the DVA compositions comprises about 80 to about 10 wt % of the composition, based on resin plus rubber; preferably about 70 to about 20 wt %; more preferably 60 to about 40 wt % rubber, based on the resin plus rubber component of the blend. Where it is desired to prepare a DVA for use in blown film with good heat shrink properties, the curable rubber preferably comprises about 10 to about 40 wt % of the total composition, i.e., resin, plus rubber and additives; preferably at least 12 wt %; more preferably at least 15 wt %.

In addition to its polymer component, the DVA composition of this invention can include reinforcing and non-reinforcing fillers, antioxidants, stabilizers, rubber processing oils, lubricants (e.g., oleamide), antiblocking agents, antistatic agents, waxes, coupling agents for the fillers, foaming agents, pigments, flame retardants, and other processing aids known to the rubber compounding art. The pigments and fillers can comprise up to 50 wt % of the total DVA composition based on polymer component plus additives; preferably pigments and fillers comprise about 0 to about 30 wt % of the total composition.

Fillers can be inorganic fillers such as calcium carbonate, clays, silicas, talc, titanium dioxide or carbon black. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. They are derived from petroleum fractions. The type of process oil utilized will be that customarily used in conjunction with the rubber component. The ordinarily skilled rubber chemist will recognize which type of oil should be utilized with a particular rubber. The quantity of rubber process oil utilized is based on the total rubber content, both cured and uncured, and can be defined as the ratio, by weight, of process oil to the total rubber in the DVA. This ratio can vary from about 0 to about 1.5/1; preferably about 0.2/1 to about 1.00/1; more preferably about 0.3/1 to about 0.8/1. Larger amounts of process oil can be used, the deficit being reduced physical strength of the composition. Oils other than petroleum based oils, such as oils derived from coal tar and pine tar, can also be utilized. In addition to the petroleum derived rubber process oils, organic esters and other synthetic plasticizers can be used.

Antioxidants can be utilized in the composition of this invention - the particular antioxidant utilized will depend on the rubbers utilized and more than one type may be required. Their proper selection is well within the ordinary skill of the rubber processing chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating to shield the part from oxygen, ozone, etc.

The chemical protectors generally fall into three chemical groups; secondary amines, phenolics and phosphites. Illustrative, non-limiting examples of types of antioxidants useful in the practice of this invention are hindered phenols, amino phenols, hydroquinones, alkyldiamines, amine condensation products, etc. Non-limiting examples of these and other types of antioxidants are styrenated phenol; 2,2'-methylene-bis(4-methyl-6-1, butylphenol); 2,6'-di-t-butyl-o-dimethylamino-p-cresol; hydroquinone monobenzyl ether; octylated diphenyl amine; phenyl-beta-naphthylamine; N,N'-diphenylethylene diamine; aldol-alpha-naphthylamine; N,N'-diphenyl-p-phenylene diamine; etc. The physical antioxidants include mixed petroleum waxes and microcrystalline waxes.

Any conventional cure system for the rubber to be dynamically vulcanized can be used except that peroxide cures are specifically excluded from the practice of this invention. Under conditions which would result in a fully cured rubber using peroxide, the plastomeric ethylene copolymer in the thermoplastic resin would vulcanize, thereby resulting in a fully cured non-thermoplastic composition. Otherwise, any particular curatives known in the art for the vulcanization of rubbers are suitable for the blends incorporating the plastomeric ethylene copolymer. These include sulfur cures as well as non-sulfur cures. For example, halogenated butyl rubber can be cured using zinc oxide. Of course, accelerators such as dithiocarbamates or thiurams and thioureas can be included in these zinc oxide cures. Zinc oxide free cures of halogenated butyl rubber known to the art can also be utilized. For example, such vulcanizing systems comprise litharge, 2-mer-captoimidazoline and diphenyl guanidine.

Resin cures can be used for both butyl rubber, halogenated butyl rubber and the EPDM rubbers. The resins useful as curatives are phenolic resins, brominated phenolic resins, urethane resins, etc. The halogenated resin cure systems are generally metal activated where the rubber is an EPDM.

While phenolic resin cures are suitable cures, they impart a yellowish or orangish tinge to the rubber part. For halogenated butyl rubber, a preferred cure is one based on ZnO and/or MgO. Such cures permit the use of pigments such as $TiO_2$ to give bright white compositions. In this system, the MgO acts not as an accelerator but as an acid acceptor to stabilize the rubber from dehydrohalogenation.

Illustrative of accelerators which can be used in conjunction with ZnO for curing halobutyl rubber are 2,6-di-tert-butyl-para-cresol; N,N'-diethylthiourea; di-ortho-tolylguanidine; dipentamethylene thiuram tetrasulfide; ethylene trithiocarbonate; 2-mercaptobenzothiazole; benzothiazole disulfide; N-phenyl-betanaphthylamine; tetramethyl thiuram disulfide, zinc diethyldithiocarbamate, zinc dibutyldithiocarbamate, and zinc dimethyldithiocarbamate. Formulations for the ZnO cure of halobutyl rubber are well known in the art. A preferred cure system comprises ZnO and m-phenylene bismaleimide since this system results in a vulcanized rubber with low compression set.

It is within the scope of this invention to incorporate an uncured rubber in the composition. In most circumstances, this can be accomplished by selecting as the uncured rubber a rubber which cannot be vulcanized by the vulcanizing agent used to cure the rubber which is to be dynamically vulcanized. For example, where the rubber to be cured is a halogenated rubber and the cure system comprises ZnO, any other rubber which requires sulfur or another curative to vulcanize it or is not vulcanizable can be included. Such rubbers include EPM, EPDM, polyisobutylene, natural rubber, etc.

Another means of incorporating the uncured rubber is by utilizing halobutyl rubber as the dynamically vulcanized rubber and butyl rubber as the uncured rubber, where the cure system is ineffective to cure the butyl rubber, e.g. zinc oxide. In another embodiment the DVA can first be prepared from the resin and the rubber by dynamic vulcanization and after vulcanization a second uncured rubber can be blended into the DVA at a temperature above the melting point of the thermoplastic resin.

In another embodiment of this invention, two rubbers are blended together and one of them is dynamically vulcanized using a cure system which is not effective for the other rubber, thereby forming a composition comprising a fully vulcanized rubber dispersed within the unvulcanized rubber. This composition can then be let down into the plastomeric ethylene copolymer resin to form the composition of this invention.

In a variant of this invention, a first rubber is dynamically vulcanized while in intimate contact with a plastomeric ethylene copolymer utilizing an excess of vulcanizing agent to form the DVA of this invention. Thereafter, additional rubber is added and dynamically vulcanized, the quantity of curative having been preselected to ensure that it is inadequate to fully vulcanize the additional rubber.

In another embodiment of this invention the DVA is prepared using a plastomeric ethylene copolymer and one rubber. Subsequently, under conditions of dynamic vulcanization a second rubber is added to the DVA with only sufficient curative to partially cure the second rubber. For example, ethylene copolymer and an EPDM are blended and a sulfur curative added. The EPDM is dynamically vulcanized to form the DVA of this invention. Subsequently, chlorobutyl rubber is added with just sufficient ZnO to only partially cure the chlorinated butyl rubber.

Where an uncured rubber is included in the DVA composition of this invention, it comprises 0 to about 25 wt % of the total rubber in the composition, preferably about 5 to about 20 wt %.

While any combination of rubbers may be utilized, the preferred rubbers are halogenated rubber which can be ZnO cured; e.g., halogenated butyl rubber and polychloroprene. These rubbers when ZnO cured result in products which have a low odor and have broad FDA compliance in uses such as pharmaceutical enclosures, I.V. solution bag port caps, stoppers, syringes, jar seals, food storage bins, etc.

In a preferred embodiment, the rubber to be vulcanized is chlorinated or brominated butyl rubber. Such halogenated butyl rubbers are preferably vulcanized with zinc oxide cures. Sulfur-bearing accelerators can be utilized with the zinc oxide. This accelerator will generally not vulcanize sulfur curable rubbers such as EPDM when used at the low levels necessary to cure a halogenated butyl rubber.

Illustrative of accelerators which can be used in conjunction with ZnO for curing halobutyl rubber are 2,6-di-tert-butyl-para-cresol; N,N'-diethylthiourea; di-ortho-tolylguanidine; dipentamethylene thiuram tetrasulfide; ethylene trithiocarbonate; 2-mercaptobenzothiazole; benzothiazole disulfide; N-phenyl-betanaphthylamine; tetramethyl thiuram disulfide, zinc diethyldithiocarbamate, zinc dibutyldithiocarbamate, and zinc dimethyldithiocarbamate. Formulations for the ZnO cure of halobutyl rubber are well known in the art. A preferred cure system comprises MgO, ZnO and zinc diethyl-dithiocarbamate since this system results in a vulcanized rubber with low compression set.

In the practice of this invention a thermoplastic resin comprising or containing the plastomeric ethylene copolymer is mixed with a rubber at a temperature sufficient to soften the resin or, more commonly, at a temperature above its melting point where the resin is crystalline at room temperature. After the resin and rubbers are intimately mixed, the curative is added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the peak melting point of the resin (about 35° to 125° C. in the case of ethylene-hexene or ethylene-butene copolymer) to about 250° C.; more typically, the temperature range is about 150° C. to about 225° C. Preferably the vulcanization is carried out at a temperature of about 160° C. to about 200° C.

It is preferred that the mixing process be continued until vulcanization is complete. If vulcanization is permitted to continue after mixing has stopped, the composition will not be reprocessible as a thermoplastic. However, the dynamic vulcanization can be carried out in stages. For example, vulcanization can be commenced at high temperatures in a twin screw extruder and before vulcanization is complete pellets can be formed of the partially prepared DVA using an underwater pelletizer, thereby quenching the curing step. At a later time vulcanization can be completed under dynamic vulcanization conditions. Those ordinarily skilled in the art will appreciate the appropriate quantities, types of curatives and extent of mixing time required to carry out the vulcanization of the rubber. Where necessary the rubber can be vulcanized using varying amounts of curative to determine the optimum cure system to be utilized and the appropriate cure conditions to obtain a full cure.

While it is preferred that all components be present in the mix prior to carrying out the dynamic vulcanization process of this invention, this is not a necessary condition. For example, only the rubbers need be mixed thoroughly, followed by dynamic vulcanization in the absence of thermoplastic resin. After vulcanization is complete, the dynamically vulcanized blend of rubbers can be let down into a plastomeric ethylene copolymer resin to prepare the compositions of this invention.

The term "fully vulcanized" as used in the specifications and claims with respect to the dynamically vulcanized rubber component of this invention means that the rubber component to be vulcanized has been cured to a state in which the physical properties of the rubber are developed to impart elastomeric properties to the rubber generally associated with the rubber in its conventional vulcanized state. The degree of cure of the vulcanized rubber can be described in terms of gel content or conversely extractable components. Alternatively, the degree of cure can be expressed in terms of cross-link density.

Where the determination of extractable is an appropriate measure of the state of cure, the improved thermoplastic elastomeric compositions are produced by vulcanizing the curable rubber component of the blends to the extent that the composition contains no more than about four percent by weight of the cured rubber component extractable at room temperature by a solvent which dissolves the rubber which is intended to be vulcanized, and preferably to the extent that the composition contains less than two percent by weight extractable. In general, the less extractables of the cured rubber component, the better are the properties and still more preferable are compositions comprising essentially no extractable rubber from the cured rubber phase (less than 0.5 wt %). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the compositions soluble in organic solvent, as well as that rubber component of the DVA which it is not intended to cure. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the cross-link density determined as described provides a useful approximation of the cross-link density of the thermoplastic elastomeric compositions is consistent with the thermoplastic properties and with the fact that the large proportion of the resin can be removed from the composition by high temperature solvent extraction, for example, by boiling decalin extraction.

The cross-link density of the rubber is determined by equilibrium solvent swelling using the Flory-Rehner equation. *J. Rubber Chem. and Tech.* 30, p. 928. The appropriate Huggins solubility parameters for rubber-solvent pairs used in the calculation were obtained from the review article by Sheehan and Bisio, *J. Rubber Chem. & Tech.*, 39, 149. If the extracted gel content of the vulcanized rubber is low, it is necessary to use the correction of Bueche wherein the term "v" is multiplied by the gel fraction (% gel/100). The cross-link density is half the effective network chain density "v" determined in the absence of resin. The cross-link density of the vulcanized blends should therefore be understood to refer to the value determined on the same rubber as in the blend in the manner described. Still more preferred compositions meet both of the aforedescribed measures of state of cure, namely, by estimation of cross-link density and percent of rubber extractable.

In the practice of this invention resins such as LDPE, LLDPE and polybutylene can be utilized in conjunction with the ethylene copolymer resin. Generally, any resin with a crystalline melting point of less than 126° C. can be used in conjunction with the ethylene copolymer resin.

In order to produce a heat shrink composition from the DVA composition of this invention, the DVA compositions are prepared in accordance with procedures well-known in the art. The DVA composition is oriented at a temperature slightly below the softening point of the thermoplastic resin and "frozen" into the oriented configuration, i.e., film, tubing, tape, etc. The forming of a product and its orientation can be continuous, e.g., blown film, or can be accomplished in a separate operation. Upon subsequent heating to a temperature above the softening point of the thermoplastic resin, the composition will shrink.

The advantages of the instant invention will be more readily appreciated by reference to the following examples. Ingredients used in making compositions as reported in the examples are identified in Table 1.

EXAMPLES 1–10

Comparative and inventive compositions as described in Table 2 were mixed in a 3 lb. Banbury mixer using a 7 to 8.5 minute cycle. The blend compositions were dynamically vulcanized in the mixer by prolonging the mix for 3.5 minutes at an elevated temperature of 400° to 430° F. after the addition of the cure system. The compositions containing ethylene-hexene, Examples 2, 4, 6, 8, and 10, were more viscous than the comparative blend compositions and this produced a faster temperature rise and correspondingly shorter cycle for dynamic vulcanization. After completion of dynamic vulcanization each blend was sheeted out on a cool mill and then ground for feed to a 15-ton Boy injection molding machine. Dumbbells were injection molded from each blend and compared in properties. The properties measured for each are reported in Table 3. The test procedures employed in making the property measurements are identified in Table 4. Examples utilizing ethylene-butene in place of ethylene-hexene are prepared as exemplified.

TABLE 1

| | |
|---|---|
| EVA (LD 722.6; 20% VA) | Ethylene-vinyl acetate copolymer, 20% vinyl acetate, MI 3, EXXON |
| EVA (XR - 70.36; 28% VA) | Ethylene-vinylacetate copolymer, 28% vinyl acetate, MI 3, EXXON |
| Gulf EMA (20% MA) | Ethylene-methyl acrylate copolymer, 20% methyl acrylate, MI 2.4, Density 0.942, slip/antiblock package included |
| Chlorobutyl 1066 | Chlorinated isoprene-isobutylene copolymer, 51–60 Mooney Viscosity (1 + 8) 100° C., Exxon Chemical AMERICAS |
| Neoprene W | Polychloroprene elastomer, Mooney Viscosity (1 + 4) 100° C. 42–52, du Pont Elastomers |
| Ethylene-Hexene | Ethylene-hexene copolymer, 30% 1-hexene, MI 2.8, density 0.88, 11.7% crystallinity, EXXON |
| Circosol 4240 Oil | Naphthenic oil, ASTM D2226, Type 103, Sun Oil Co. |
| Atomite | Natural ground calcium carbonate, mean particle size 3 microns; THOMPSON, WEINMAN & COMPANY |
| Maglite D | Magnesium oxide, C. P. Hall Co. |
| Irganox B-215 | Hindered Phenolic Antioxidant, Thermal Stabilizer, Ciba-Geigy |
| Irganox 1010 | Hindered Phenolic Antioxidant, Thermal Stabilizer, Ciba-Geigy |
| Stearic Acid | Long chain fatty acid |
| DLTDP | Dilaurylthiodipropionate |
| Protox 169 Zinc Oxide | French process zinc oxide |
| Permalux | Di-ortho guanidine salt of dicatechol borate |
| ZDEDC | Zinc diethyl dithiocarbamate |

TABLE 2

| | EXAMPLE NO. | | | | | | | | | |
|---|---|---|---|---|---|---|---|---|---|---|
| | 1 | 2 | 3 | 4 | 5 | 6 | 7 | 8 | 9 | 10 |
| EVA (LD 722.62; 20% VA) | 27 | — | 18 | — | — | — | — | — | — | — |
| EVA (XR-70.36; 28% VA) | — | — | — | — | 40 | — | 18.5 | — | — | — |
| Gulf EMA (20% MA) | — | — | — | — | — | — | — | — | 18.5 | — |
| Chlorobutyl 1066 | 27 | 27 | 36 | 36 | 35 | 35 | 18.5 | 18.5 | 18.5 | 18.5 |
| Neoprene W | — | — | — | — | — | — | 18.5 | 18.5 | 18.5 | 18.5 |
| Ethylene-Hexene (30% 1-Hexene) | — | 27 | — | 18 | — | 40 | — | 18.5 | — | 18.5 |
| Circosol 4240 Oil | 20 | 20 | 20 | 20 | 15 | 15 | 15 | 15 | 29 | 29 |
| Atomite | 19 | 19 | 19 | 19 | 6 | 6 | 22.5 | 22.5 | 8.4 | 8.4 |
| Maglite D | 1.8 | 1.8 | 1.8 | 1.8 | 0.5 | 0.5 | 1.8 | 1.8 | 1.8 | 1.8 |
| Irganox B-215 | 0.2 | 0.2 | 0.2 | 0.2 | — | — | — | — | — | — |
| Irganox 1010 | — | — | — | — | 0.2 | 0.2 | 0.2 | 0.2 | 0.1 | 0.1 |
| Stearic Acid | 0.5 | 0.5 | 0.5 | 0.5 | — | — | 0.5 | 0.5 | 0.5 | 0.5 |
| DLTDP | — | — | — | — | — | — | — | — | 0.1 | 0.1 |
| Protox 169 Zinc Oxide | 3.6 | 3.6 | 3.6 | 3.6 | 2.5 | 2.5 | 3.6 | 3.6 | 3.6 | 3.6 |
| Permalux | 0.9 | 0.9 | 0.9 | 0.9 | — | — | 0.9 | 0.9 | 0.9 | 0.9 |
| ZDEDC | — | — | — | — | 0.8 | 0.8 | — | — | — | — |

TABLE 3

| | 1 | 2 | 3 | 4 | 5 | 6 | 7 | 8 | 9 | 10 |
|---|---|---|---|---|---|---|---|---|---|---|
| Injection Molded @ °C. | — | — | — | — | 200 | 240 | 240/160 | 240 | 240 | 240 |
| Shore A Hardness, Instantaneous | 60 | 47 | 57 | 45 | 55 | 50 | 57/58 | 47 | 48 | 39 |
| Shore D Hardness, Instantaneous | — | — | — | — | 14 | 11 | 15/16 | 11 | 10 | 7 |
| 100% Modulus, psi | — | — | — | — | 390 | 405 | 680/865 | 260 | 390 | 190 |
| Tensile Strength, psi | 755 | 540 | 710 | 450 | 870 | 955 | 1015/865 | 420 | 495 | 365 |
| Flexural Modulus, psi | — | — | — | — | 765 | 580 | 035/— | 560 | 500 | 360 |
| Ultimate Elongation, % | 190 | 150 | 110 | 100 | 410 | 360 | 190/100 | 200 | 140 | 220 |
| Set at Break, % | 30 | 15 | 8 | 2 | 110 | 40 | 10/2 | 9 | 10 | 5 |
| Tension Set, % | — | — | — | — | 21 | 12 | 5/— | 4 | — | 13 |

TABLE 3-continued

|  | 1 | 2 | 3 | 4 | 5 | 6 | 7 | 8 | 9 | 10 |
|---|---|---|---|---|---|---|---|---|---|---|
| Compression Set B, Piled | | | | | | | | | | |
| 22 Hrs. @ RT, % | 28 | 24 | 26 | 22 | 22 | 22 | 16/28 | 29 | 19 | 31 |
| 22 Hrs. @ 50° C., % | 61 | 54 | 50 | 55 | 76 | 72 | 60/60 | 53 | 43 | 52 |
| Spiral Flow, cm @ 800 psi | — | — | — | — | 16 | 10 | 4/12 | 8 | 19 | 15 |

TABLE 4

| | |
|---|---|
| Shore A Hardness, Instantaneous | ASTM D2240 |
| Shore D Hardness, Instantaneous | ASTM D2240 |
| 100% Modulus, psi | ASTM D412 |
| Tensile Strength, psi | ASTM D412 |
| Flexural Modulus, psi | ASTM D790 |
| Ultimate Elongation, % | ASTM D412 |
| Set at Break, % | ASTM D412 |
| Tension Set, % | ASTM D412 |
| Compression Set B, Piled | ASTM D395 |
| 22 Hrs. @ RT, % | |
| 22 Hrs. @ 50° C., % | |
| Spiral Flow, cm @ 800 psi | Length of filled portion of a spiral-shaped mold having mold pathway of 0.3 cm diameter at 260° C. |

Examples 1, 2, 3, 4, 5 and 6 are binary DVA blends (i.e. a thermoplastic resin and a single rubber component) and Examples 7, 8, 9 and 10 are ternary DVA blends (i.e. a thermoplastic resin and two rubber components). Examples 1, 3 and 5 are comparative binary DVA blends made in accordance with U.S. Pat. No. 4,639,487 utilizing ethylene-vinyl acetate copolymer as the thermoplastic resin. Examples 2, 4 and 6 are binary DVA blends which are identical in composition to the comparative blends except for the use, in accordance with this invention, of a plastomeric ethylene-hexene copolymer as the thermoplastic resin rather than an ethylene-vinyl acetate (EVA) copolymer.

As shown by the measured shore hardness values, the DVA blends of the invention, Examples 2, 4 and 6, are in each case softer that their counterpart DVA blends utilizing EVA. Likewise the DVA blends of the invention exhibit greater elasticity than their counterpart comparative DVA blends as measured by a lower set at break value. Each DVA blend of the invention exhibits a comparable or higher resiliency as shown by its comparable or lower compression set value than the comparative blends. The highly oil extended DVA blends of Examples 2 and 4 show a moderately lower strength based on measured tensile strength and elongation, than their comparative counterparts whereas the DVA blend of Example 6 possesses comparable strength compared to its counterpart.

Examples 7, 8, 9 and 10 are ternary DVA blends utilizing two different rubber components namely chlorinated butyl rubber and neoprene. The DVA blends of Examples 7 and 9 are comparative blends made in accordance with U.S. Pat. No. 4,639,487 utilizing as the thermoplastic resin either an ethylene-vinyl acetate copolymer (Example 7) or an ethylene-methylacrylate copolymer (Example 9). Examples 8 and 10 are DVA blends made in accordance with this invention utilizing a plastomeric ethylene-hexene copolymer as the thermoplastic resin, but otherwise are identical in composition to their respective comparative counterpart DVA blends.

Each DVA blend of the invention, Examples 8 and 10, exhibits greater flexibility and softness as shown by their lower values for flexural modulus and shore hardness than their counterpart comparative DVA blends. Each DVA blend of the invention has comparable or increased elasticity although each has decreased tensile strength in comparison.

It is believed that the apparently greater tensile strength of the EVA-based ternary blend DVA of Example 7 is due to the thermal instability of the high vinyl acetate content copolymer thermoplastic resin which, at high processing temperatures, undergoes homolytic cleavage to liberate acetic acid which results in intermolecular cross-linking in the thermoplastic matrix. Dumbbells of the DVA composition of Examples 7 and 8 were molded at 240° C. with sequentially longer residence times in the injection press. As the residence time increased it became impossible to mold a complete dumbbell of the Example 7 DVA composition whereas complete dumbbells were always molded with the Example 8 DVA composition. Whereas the Example 7 DVA composition was rheologically unstable at the 240° C. processing temperature and would undergo a cure to a thermoset state rendering it impossible to complete the molding of a dumbbell, the Example 8 DVA composition was completely rheologically stable under identical condition.

Although the invention has been described with reference to its preferred embodiments, those of ordinary skill in the art may, upon reading this disclosure, appreciate changes and modifications which may be made which do not depart from the scope and spirit of the invention as described above or claimed hereafter.

We claim:

1. A thermoplastic elastomeric composition comprising:
   (a) a thermoplastic resin comprising at least about 25 weight percent, based on the weight of said thermoplastic resin, of a plastomeric copolymer selected from the group consisting of ethylene-hexene copolymer, ethylene-butene copolymer, and mixtures thereof, said plastomeric copolymer having a density of less than about 0.900 and a degree of crystallinity measured as a heat of fusion of from about 5 to about 85 J/g, said ethylene-hexene copolymer comprising at least about 20 weight percent of said hexene, said ethylene-butene comprising at least about 20 weight percent of said butene; and
   (b) a rubber selected from the group consisting of halogenated butyl rubber, butyl rubber, ethylene-propylene-diene rubber, polyisoprene, polychloroprene, styrene-butadiene rubber, nitrile rubber, chlorosulfonated polyethylene, and mixtures thereof, said rubber having been non-peroxide vulcanized to a fully cured state in the presence of said plastomeric copolymer.

2. The composition according to claim 1 wherein the thermoplastic resin includes from about 35 to 100 wt % of ethylene-hexene copolymer, ethylene-butene copolymer or mixtures thereof and a polyolefin resin having a melt point of less than about 126° C. ranging from 0 to about 65 wt % of the thermoplastic resin.

3. The composition of claim 1 wherein the thermoplastic resin ranges from about 20 to about 90 wt % of the thermoplastic resin plus rubber components of the composition.

4. The composition of claim 1 wherein the vulcanized rubber ranges from about 10 to about 80 wt % of the thermoplastic resin plus rubber components of the composition.

5. The composition according to claim 1 further comprising as part of the thermoplastic resin a polyolefin resin selected from the group consisting of LDPE, LLDPE and polybutylene.

6. The composition according to claim 1 wherein the dynamically vulcanized rubber ranges from about 20 to about 70 wt % of the thermoplastic resin plus rubber components of the composition.

7. The composition according to claim 6 wherein the dynamically vulcanized rubber ranges from about 40 to about 60 wt % of the thermoplastic resin plus rubber components.

8. The composition according to claim 1 wherein the dynamically vulcanized rubber is a halogenated butyl rubber.

9. The composition according to claim 8 wherein the halogenated butyl rubber is chlorinated butyl rubber or brominated butyl rubber.

10. The composition according to claim 1 having incorporated therein 0 to about 25 wt %, based on total rubber, of an uncured rubber.

11. The composition according to claim 10 wherein the uncured rubber comprises about 5 to about 20 wt % of the total rubber in the composition.

12. The composition according to claim 10 wherein the uncured rubber is EPM, EPDM, polyisobutylene, natural rubber, or butyl rubber.

13. The composition according to claim 10 wherein the vulcanized rubber is a halogenated rubber and the uncured rubber is an EPM.

14. The composition according to claim 13 wherein the halogenated rubber is chlorinated butyl rubber or brominated butyl rubber.

15. The thermoplastic elastomeric composition of claim 1, wherein said plastomeric copolymer has a density of about 0.870 to about 0.900.

16. The thermoplastic elastomeric composition of claim 1, wherein said plastomeric copolymer has a melt index ranging from about 0.3 to about 50.

17. A process for preparing a dynamically vulcanized composition comprising a thermoplastic resin and a fully vulcanized rubber, which comprises the steps of:

(a) blending a thermoplastic resin comprising a plastomeric copolymer selected from the group consisting of ethylene - hexene copolymer, ethylene-butene copolymer and mixtures thereof, said plastomeric copolymer having a density of less than about 0.900 and a degree of crystallinity measured as a heat of fusion of from about 5 to about 85 J/g, said ethylene-hexene copolymer comprising at least about 20 weight percent of said hexene, said ethylene-butene copolymer comprising at least about 20 weight percent of said butene, and rubber at a temperature above the melting point of said resin to produce a blend, said rubber being selected from the group consisting of halogenated butyl rubber, butyl rubber, ethylene-propylene-diene rubber, polyisoprene, polychloroprene, styrene-butadiene rubber, nitrile rubber, chlorosulfonated polyethylene, and mixtures thereof;

(b) adding a non-peroxide cure system effective for vulcanizing only said rubber in said blend; and (c) vulcanizing said rubber under dynamic vulcanization conditions for a time sufficient to vulcanize fully said rubber and produce a dynamically vulcanized blend.

18. The process according to claim 17 further comprising incorporating an additional rubber not vulcanizable by the cure system.

19. The process according to claim 18 wherein said incorporating of the additional non-vulcanizable rubber is simultaneous with said blending of a thermoplastic resin, plastomeric copolymer and rubber and prior to said vulcanizing.

20. The process according to claim 18 wherein said step of incorporating of an additional rubber is after said vulcanizing of the rubber and further comprises shearing mixing until the additional rubber is uniformly dispersed in the dynamically vulcanized blend.

21. The process according to claim 17 further comprising incorporating an additional rubber after the rubber is fully vulcanized; said additional rubber being vulcanizable by the cure system; provided, however, that the cure system is fully consumed during the vulcanizing step and is unavailable to vulcanize any part of the additional rubber.

22. The process according to claim 17 further comprising incorporating an additional rubber which is vulcanizable by the cure system to the blend after the rubber is fully vulcanized; said cure system being present in an amount sufficient to at least partially cure the additional rubber, but insufficient to fully vulcanize the additional rubber.

* * * * *